Figure 1:
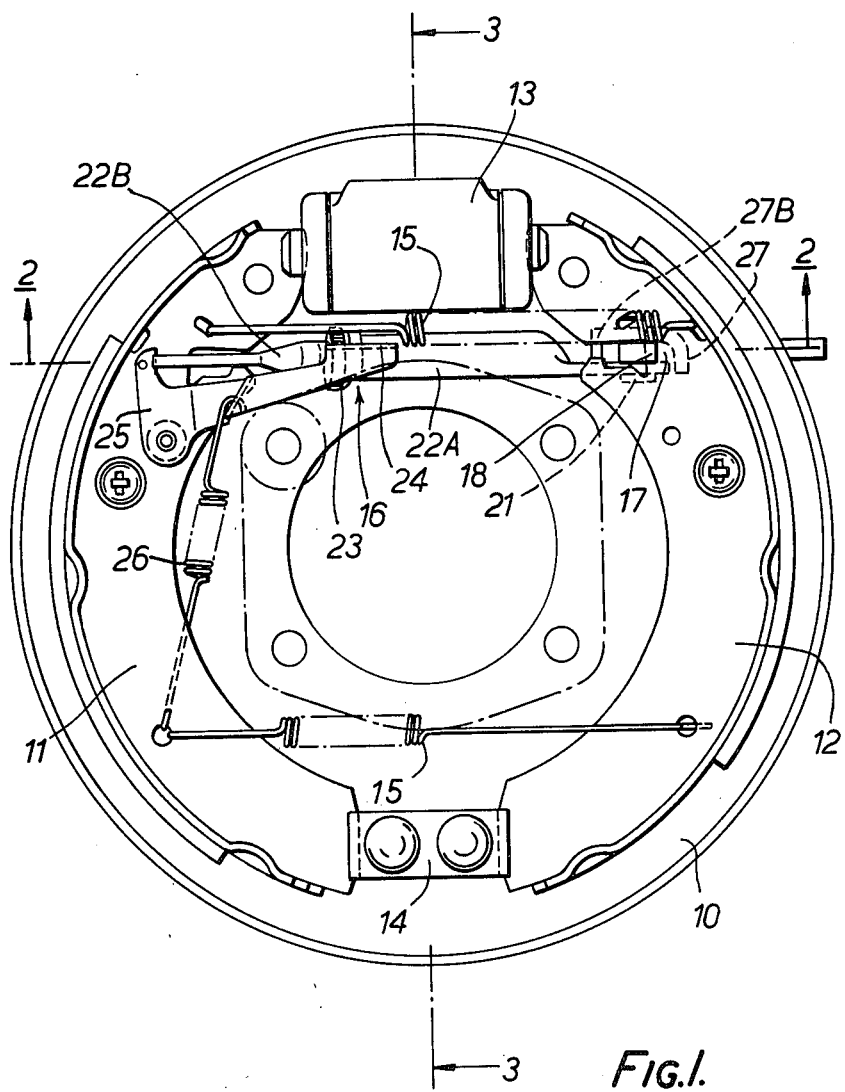

United States Patent [19]

Langert

[11] 4,270,632

[45] Jun. 2, 1981

[54] INTERNAL SHOE DRUM BRAKES

[75] Inventor: Albert Langert, Neuwied, Fed. Rep. of Germany

[73] Assignee: Girling Limited, Birmingham, United Kingdom

[21] Appl. No.: 7,836

[22] Filed: Jan. 30, 1979

[30] Foreign Application Priority Data

Feb. 1, 1978 [GB] United Kingdom ............... 3993/78

[51] Int. Cl.³ .......................................... F16D 65/56
[52] U.S. Cl. ...................... 188/79.5 P; 188/196 BA
[58] Field of Search ............... 188/79.5 GT, 79.5 P, 188/106 A, 196 BA, 206 R

[56] References Cited

U.S. PATENT DOCUMENTS

| 2,287,239 | 6/1942 | Goepfrich | 188/106 A X |
| 3,963,100 | 6/1976 | Kaub | 188/79.5 P |
| 4,079,819 | 3/1978 | Shirai et al. | 188/106 A X |

Primary Examiner—Duane A. Reger

Attorney, Agent, or Firm—Scrivener, Clarke, Scrivener & Johnson

[57] ABSTRACT

An internal shoe drum brake comprises a pair of brake shoes, an adjustable length strut extending between the shoes and having a ratchet movement of which adjusts the length of the strut, an actuating lever pivotally connected to one end of the strut and engaging one shoe, the lever being so arranged that a force acting on one end in a direction generally parallel to the drum axis rotates the lever to exert a force on one shoe and a reaction force through the intermediary of the strut on the other shoe to urge said shoes apart, and a pawl engageable with the ratchet. To reduce the number of parts the pawl is pivotally mounted on the other shoe and is rotatable about its pivot to move the ratchet and thereby adjust the length of the strut when there is excess wear of the shoes. Furthermore, the strut preferably has a portion which is engageable with a surface portion of the brake back plate, or a member secured to the back plate, to react forces to the back plate. The surface portion is preferably parallel with the strut axis to permit sliding movement of the strut thereon.

7 Claims, 4 Drawing Figures

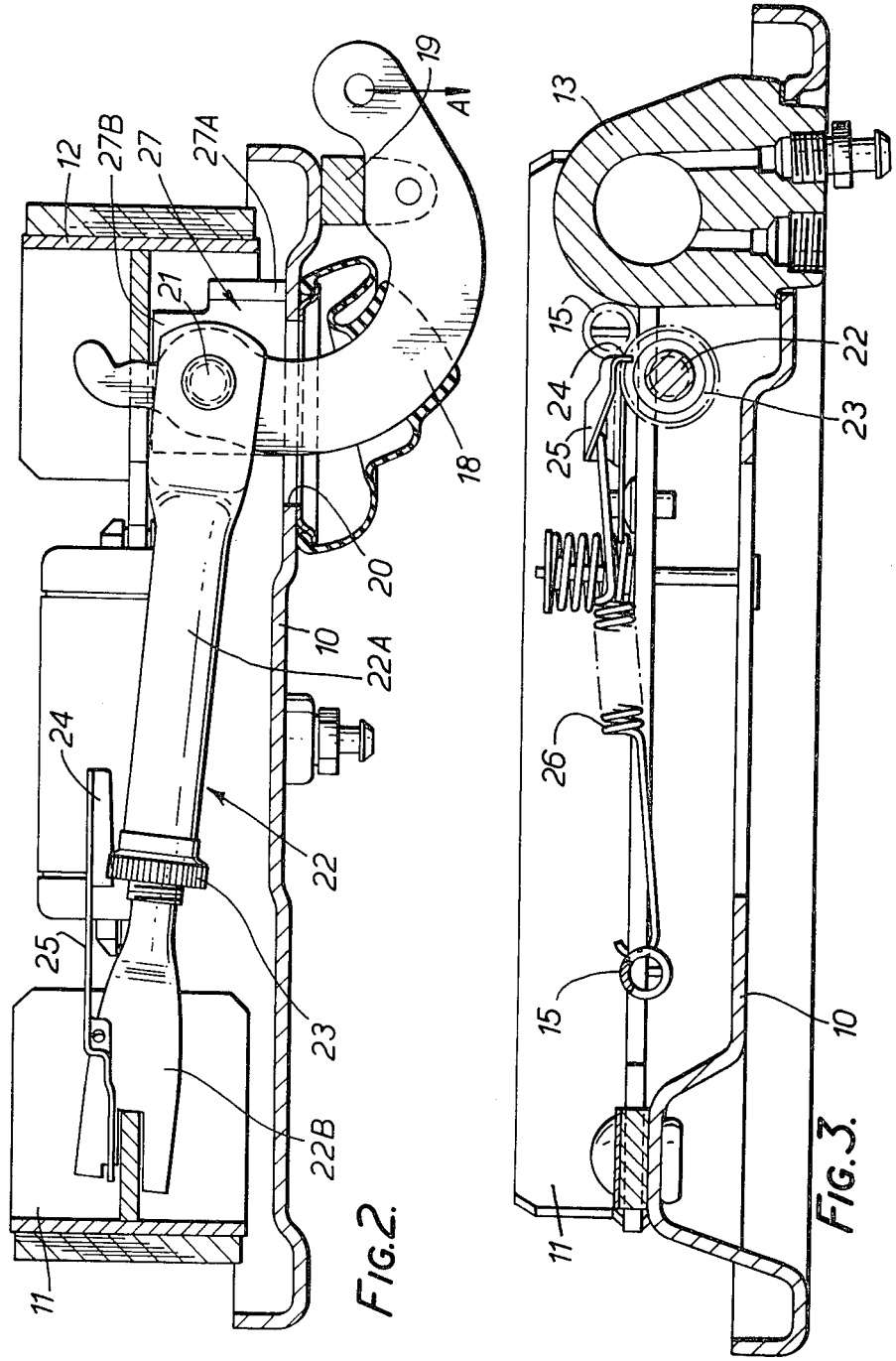

INTERNAL SHOE DRUM BRAKES

This invention relates to internal shoe drum brakes.

Such brakes are known which have a pair of brake shoes which can be expanded by power actuated means to engage a brake drum for service brake operation and manually by an auxiliary actuator for parking. Automatic adjusting means is commonly provided to adjust the distance between the brake shoes to compensate for wear of the shoe friction linings. The adjusting means usually comprises an adjustable length strut acting between the brake shoes and having two relatively rotatable parts screw-threaded together, one of the parts comprising a ratchet wheel engageable by a pawl which is movable when excess wear of the linings is sensed to rotate the ratchet wheel and adjust the length of the strut.

In a particular known form of such brake described in U.S. Pat. No. 3719258, one end of the strut abuts one shoe and the other end is pivotally connected to a bellcrank lever of the auxiliary brake, one arm of the lever engaging the other shoe. Rotation of the lever urges said other shoe outwardly and the reaction forces urge the strut and thus the said one shoe in the opposite direction. In that brake the auxiliary actuator is "crosspull", i.e. the lever is actuated by a force which is generally parallel with the drum axis.

The strut and lever are pivotally mounted on one end of an elongate shaft which extends perpendicular to the drum axis and which is supported at its other end by a support attached to the back plate. The shaft carries a coil torsion spring which biases the pawl into engagement with the ratchet wheel, rotation of the shaft causing the pawl to rotate the ratchet wheel to adjust the strut length when there is excess wear of the shoes.

One feature of the present invention aims to improve such a known brake and provides a brake comprising a pair of brake shoes, an adjustable length strut extending between the shoes and having a ratchet, movement of which adjusts the length of the strut, an actuating lever pivotally connected to one end of the strut and engaging one shoe, the lever being so arranged that a force acting on one end thereof in a direction generally parallel to the drum axis rotates said lever to exert a force on said one shoe and a reaction force through the intermediary of said strut on said other shoe to urge said shoes apart, and a pawl engageable with said ratchet, wherein said pawl is pivotally mounted on said other shoe and is rotatable about said pivot to move the ratchet and thereby adjust the length of the strut when there is excess wear of the shoes.

Thus, the cost of said elongate shaft of the known brake and the production cost of mounting the shaft on said support attached to the back plate is eliminated.

The brake of the invention may have a support member engaged with a back plate and supporting the pivot of said strut and the lever, so that forces acting parallel with the drum are reacted to the back plate through said member.

The strut may, however, itself engage the back plate to react said force components acting parallel with the back plate. In a presently preferred embodiment, the strut engages a portion of the surface of the back plate, or a member mounted thereon, which surface portion is parallel with a straight line joining the pivot point of the lever with the strut and the latter's point of abutment with the other shoe. During movement of the strut upon rotation of the auxiliary actuator lever, the strut slides along said surface portion. The surface portion is preferably formed by pressing the back plate.

Thus, in accordance with another feature of the invention, there is provided an internal shoe drum brake comprising a pair of brake shoes, a lever pivotally coupled to an adjustable length strut, the arrangement being such that a force acting on said lever in a direction parallel wth the drum axis applies a force to one shoe and, through the intermediary of the strut, to the other shoe to urge the shoes apart, wherein the strut has a portion which is engageable with and slidable relative to a surface portion of the back plate, or of a member secured to the back plate, which surface portion is parallel with the aforesaid straight line between the lever pivot point and the point of abutment of the strut with the other shoe.

The said surface portion is preferably formed on the back plate itself.

Figure 4:
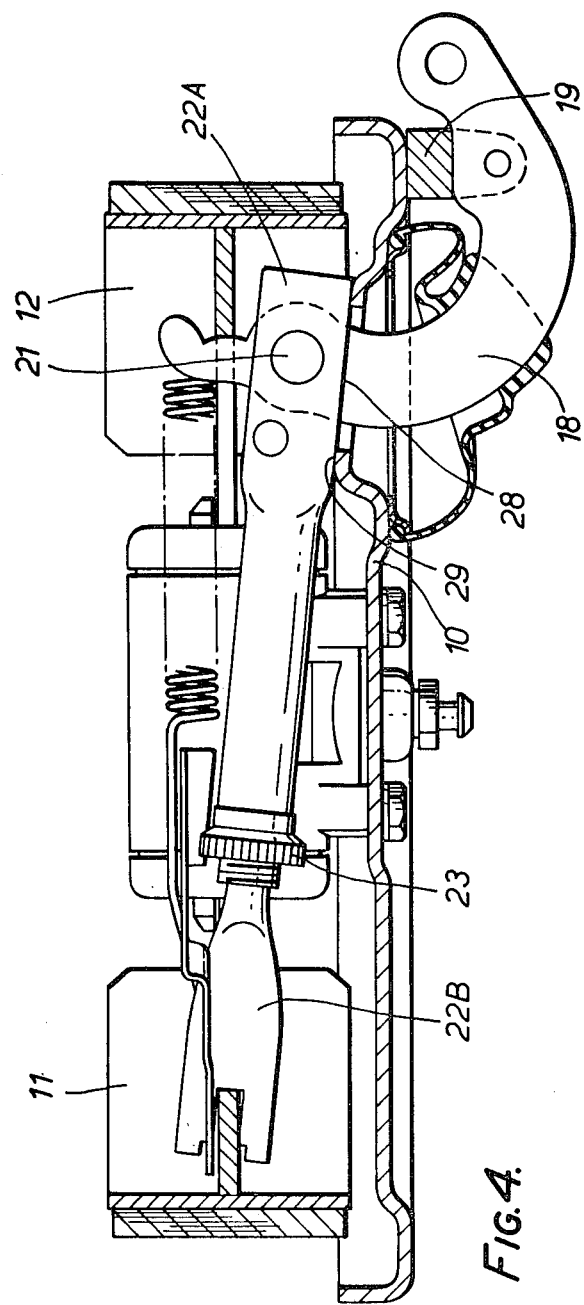

A brake in accordance with the invention and a modification thereof will now be described, by way of example, with reference to the accompanying drawings, in which:

FIG. 1 is a plan view of the brake,

FIGS. 2 and 3 are sectional views taken on lines 2—2 and 3—3, respectively of FIG. 1, and FIG. 4 is a sectional view similar to FIG. 2 of the modification.

The brake comprises a back plate 10, a pair of brake shoes 11,12 mounted on the back plate, a service hydraulic brake cylinder 13 engaging one end of each shoe to urge the shoes apart, the other end of each shoe engaging a fixed abutment 14, brake return springs 15 biasing the shoes toward each other, a brake adjuster 16 and an auxiliary brake actuator.

The auxiliary actuator 17 comprises a bellcrank lever 18 pivotally connected to a locating piece 19 engaging the rear of the back plate 10. The lever 18 extends through an aperture 20 in the back plate 10 and one arm engages at its free end one of the shoes 12. The other end of the lever is adapted for engagement to a handbrake linkage which applies a force in a direction parallel to the drum axis, indicated by arrow A in FIG. 2. Intermediate its ends, the lever 18 is pivotally connected by a pivot pin 21 to one end of an adjustable strut 22 which forms part of the adjuster. The pin 21 is supported by a support member 27 which engages the back plate 10 and reacts to the back plate 10 forces acting parallel to the drum axis. As best seen in FIG. 2, the support member 27 has an end portion 27A which extends substantially perpendicularly to a main portion 27B which supports the pin 21.

The adjustable strut 22 comprises two relatively axially movable parts 22A,22B, one of the parts 22A carrying a ratchet wheel 23, rotation of which adjusts the length of the strut in known manner. The ratchet wheel 23 is engaged by a pawl 24 at the end of one arm of a bell crank pawl lever 25 pivotally mounted on the other shoe 11. The other arm of the lever 25 engages the strut 22 and a spring 26 urges the pawl 24 into engagement with the ratchet wheel 23 and urges the strut 22 towards the right hand shoe 12.

When the actuator lever 18 is rotated, it urges the right hand shoe 12 towards the drum and the reaction forces are transmitted through the strut 22 to the left hand shoe 11. Since the relative positions of the pawl 24 and the ratchet wheel 23 remain unchanged, no adjustment takes place.

When the service brake cylinder 13 is actuated, the shoes are urged apart without movement of the strut 22 and the pawl lever 25 rotates about its pivot. If the movement is sufficient, due to wear of the brake linings, the pawl picks up a fresh tooth on the ratchet wheel 23 and effects rotation of the wheel, thereby adjusting the length of the strut.

In the modification of FIG. 4, the brake is substantially the same as that described above except that the end of the strut 22 has a straight edge 28 which engages with and is slidable relative to a projecting surface 29 of the back plate 10. The surface 29 extends parallel to a straight line between the pivot point 21 of the lever and strut and the latter's point of abutment with the shoe 11. This modification has the advantage that the forces parallel to the drum axis are transmitted directly to the back plate by the strut 22.

The surface 29 could be formed on a member (not shown) attached to the back plate, but is preferably formed as shown on a projection pressed from the back plate.

Arranging the engagement between the strut and the back plate (or the member thereon) to be parallel with the direction of movement of the strut improves efficiency of the mechanical actuation of the brake.

I claim:

1. An internal shoe drum brake comprising a pair of brake shoes, an adjustable length strut extending between the shoes and having a ratchet, movement of which adjusts the length of the strut, a cross-pull actuating lever pivotally connected to one end of the strut and engaging one shoe, the lever being so arranged that a cross-pull force acting on one end thereof in a direction generally parallel to the drum axis rotates said lever to exert a force on said one shoe and a reaction force through the intermediary of said strut and an abutting engagement thereof with said other shoe to urge said shoes apart, and a pawl engageable with said ratchet, said pawl being pivotally mounted on said other shoe and being rotatable about said pivot to move the ratchet and thereby adjust the length of the strut when there is excess wear of the shoes, wherein a portion of said strut engages a surface portion of the back plate or a member mounted on the back plate, said surface portion being substantially parallel with a straight line joining the pivot point of the lever and strut and the point of abutment of the strut with said other shoe.

2. A brake according to claim 1, wherein the lever and the strut are pivotally mounted on a support member which engages the brake back plate.

3. A brake according to claim 1, wherein the strut engages directly the back plate and the surface portion of the back plate is pressed therefrom.

4. A brake according to any of claims 1, 2 or 3, wherein the lever is pivotally mounted on a locating member which engages a rear surface of the back plate.

5. An internal shoe drum brake comprising a pair of brake shoes, a cross-pull lever pivotally coupled to an adjustable length strut, the arrangement being such that a cross-pull force acting on said lever in a direction parallel with the drum axis applies a force to one shoe and, through the intermediary of the strut, in abutting engagement therewith, to the other shoe to urge the shoes apart, wherein the strut has a portion which is engageable with and slidable relative to a surface portion of the back plate, or of a member secured to the back plate, which surface portion is parallel with a straight line joining the pivotally coupled point of the lever and strut and the point of abutment of the strut with said other shoe.

6. A brake according to claim 5, wherein the strut engages directly the back plate and the surface portion of the back plate is pressed therefrom.

7. A brake according to claim 5 or 6, wherein the lever is pivotally mounted on a locating member which engages a rear surface of the back plate.

* * * * *